United States Patent
Ochiai et al.

(10) Patent No.: US 8,480,153 B2
(45) Date of Patent: Jul. 9, 2013

(54) COWLED VEHICLE

(75) Inventors: Kazuyuki Ochiai, Wako (JP); Eikichi Monma, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/414,234

(22) Filed: Mar. 7, 2012

(65) Prior Publication Data
US 2012/0228895 A1    Sep. 13, 2012

(30) Foreign Application Priority Data
Mar. 9, 2011   (JP) .................. 2011-050976

(51) Int. Cl.
*B60N 99/00*    (2006.01)
(52) U.S. Cl.
USPC ........................................ 296/77.1; 296/180.1
(58) Field of Classification Search
USPC ...................... 296/77.1, 78.1, 180.1
See application file for complete search history.

(56) References Cited

U.S. PATENT DOCUMENTS

| 5,615,080 | A | 3/1997 | Nishitani et al. |
| 7,958,867 | B2 * | 6/2011 | Yoshizawa .................. 123/399 |
| 8,292,021 | B2 * | 10/2012 | Fukuyama et al. ........... 180/309 |
| 2006/0062003 | A1 | 3/2006 | Lee |
| 2008/0111392 | A1 * | 5/2008 | Masuda et al. ............... 296/78.1 |

FOREIGN PATENT DOCUMENTS

| DE | 4217267 A1 | 11/1993 |
| JP | 2010-42755 A | 2/2010 |

* cited by examiner

*Primary Examiner* — Lori Lyjak
(74) *Attorney, Agent, or Firm* — Westerman, Hattori, Daniels & Adrian, LLP

(57) ABSTRACT

A motorcycle includes a first cable disposed inside an inner cowl, and a second cable which is disposed between the inner cowl and an outer cowl and is connected to the first cable. The inner cowl is provided with a through-hole through which to pass the first cable or the second cable. The through-hole is provided with a recess by which a part of the first cable or the second cable is locked. This enables wiring of short cables to easily connect two kinds of cables.

14 Claims, 6 Drawing Sheets

COWLED VEHICLE

This application claims the benefit of Japanese patent application No. 2011-050976, filed on Mar. 9, 2011, the entire contents of which are incorporated herein by reference.

TECHNICAL FIELD

The present invention relates to a cowled vehicle in which a part of a vehicle body is covered doubly with an inner cowl and an outer cowl.

BACKGROUND OF THE INVENTION

In relation to motorcycles, there has been known a double-structured cowl in which a vehicle body is covered with an inner cowl and an outer cowl which partly overlap with each other. For example, Japanese Patent laid open No. 2010-42755 discloses a vehicle provided with a front upper side cowl (inner cowl) covering lateral sides of a main frame and with a middle cowl (outer cowl) further covering lateral sides of the front upper side cowl. When the double-structured cowl having the inner cowl and the outer cowl is thus provided, air can be taken in through the gap formed between the two cowls, and the air can be easily guided to a desired part of the vehicle body (for example, to an air cleaner).

SUMMARY OF THE INVENTION

Meanwhile, in the vehicle provided with the double-structured cowl as above, from the viewpoint of easier forming (molding) and enhanced external appearance (beauty) or the like, lighting parts such as winker lamps are not mounted to a body frame constituting a vehicle body but mounted directly to the inner cowl (or the outer cowl). In this case, a cable for supplying electric power to the lighting parts (hereinafter referred to also as second cable) is disposed between the inner cowl and the outer cowl, and the second cable is connected to a cable (hereafter referred to also as first cable) which is connected to a battery inside the vehicle body through a main harness.

In connecting the first cable and the second cable to each other, the second cable extended from the outside of the inner cowl is laid around a side edge portion of the inner cowl, or the first cable (or the second cable) is made to penetrate the inner cowl, and couplers for connection between the two kinds of cables are disposed in the gap between both the cowls, whereby the connection with the first cable inside the vehicle body is conducted at a position invisible from the outside. Therefore, long wiring is used as the first cable or the second cable, leading to an increase in the manufacturing cost. In addition, since an end portion (connection coupler) of the second cable composed of long wiring is led out from the comparatively narrow gap between the inner cowl and the outer cowl, the work of interconnecting the first cable and the second cable takes time and labor. Consequently, working efficiency in manufacturing the vehicle body is lowered.

A cowled vehicle is provided having a simple configuration wherein a first cable disposed inside an inner cowl and a second cable disposed outside the inner cowl are made shorter, and the first cable and the second cable can be easily interconnected, whereby efficiency of the vehicle body manufacturing process can be enhanced and manufacturing cost can be reduced.

According to a first aspect, a cowled vehicle including an inner cowl covering an inside structure of a vehicle body, and an outer cowl covering at least a part of the inner cowl on the outside of the inner cowl, is characterized in that: the cowled vehicle further includes a first cable disposed inside the inner cowl and a second cable disposed between the inner cowl and the outer cowl and connected to the first cable; either one of the inner cowl and the outer cowl is provided with a through-hole through pass the first cable or the second cable is passed; and the through-hole includes with a locking section which can retain of the first cable or the second cable.

According to a second aspect, the cowled vehicle is further characterized in that the locking section is a recess formed by partly cutting out a side peripheral edge of the through-hole.

According to a third aspect, the cowled vehicle is further characterized in that the first cable and the second cable are electrically connected to each other through connection couplers, and the through-hole is sized that the couplers can be passed therethrough.

According to a fourth aspect, the cowled vehicle is further characterized in that the first cable is connected to a battery at an end portion thereof on the opposite side to an end portion thereof for connection with the second cable, and the second cable is connected to a winker lamp at an end portion thereof on the opposite side to an end portion thereof for connection with the first cable.

According to a fifth aspect, the cowled vehicle is further characterized in that the second cable is connected to a mounting section of the inner cowl, the winker lamp includes a base portion attached to the mounting section and a lighting portion which projects in a vehicle width direction from the base portion while penetrating the outer cowl and is supplied with electric power to perform lighting, and the base portion is attached to the mounting section, whereby electrical continuity between the second cable and the lighting portion is attained.

According to the first aspect, the through-hole through which the first cable or the second cable are passable is provided. This ensures that the first cable and the second cable can be connected to each other through the through-hole, and application of shorter cable is enabled, as compared with a configuration in which the first cable and the second cable are connected to each other while passing around the inner cowl. Therefore, manufacturing cost of the vehicle body can be reduced. In addition, the first cable or the second cable is retained by the locking section. This ensures that, for example, the second cable can be retained on the locking section in the state of being exposed from the gap between the inner cowl and the outer cowl. As a result, the first cable and the second cable can be easily connected, the time taken for the connecting process can be shortened, and efficiency of the vehicle body manufacturing process can be enhanced. Moreover, after the connection the joint part between the first cable and the second cable may be disposed in the gap between the inner cowl and the outer cowl and the first cable may be locked by the locking section, whereby the joint portion can be hidden and external appearance of the vehicle body is enhanced.

According to the second aspect, the recess is formed at a side peripheral edge of the through-hole. This ensures that the first cable or the second cable can be inserted into the recess from the through-hole, and these cables can be easily retained by the recess. In addition, the retained state can be easily released by moving these cables toward the through-hole, starting from the condition wherein the first cable or the second cable is retained in the recess.

According to the third aspect, the couplers for connection between the first cable and the second cable can be passed through the through-hole. This ensures that the couplers can be easily disposed between the inner cowl and the outer cowl through the through-hole.

According to the fourth aspect, the first cable is connected to the battery, whereas the second cable is connected to the winker lamp, so that it is possible by connecting the first cable with the second cable to achieve electrical connection from the battery to the winker lamp.

According to the fifth aspect, by attaching the base portion of the winker lamp to the mounting section, it is possible to attain electrical continuity between the second cable and the lighting portion, and thereby to turn on the lighting portion of the winker lamp, without needing a complicated wiring process or the like.

BRIEF DESCRIPTION OF THE DRAWINGS

The advantages of the invention will become apparent in the following description taken in conjunction with the drawings, wherein.

DETAILED DESCRIPTION OF THE INVENTION

Now, a cowled vehicle according to the present invention will be described in detail below, showing a preferred embodiment thereof and referring to the accompanying drawings.

Figure 1:
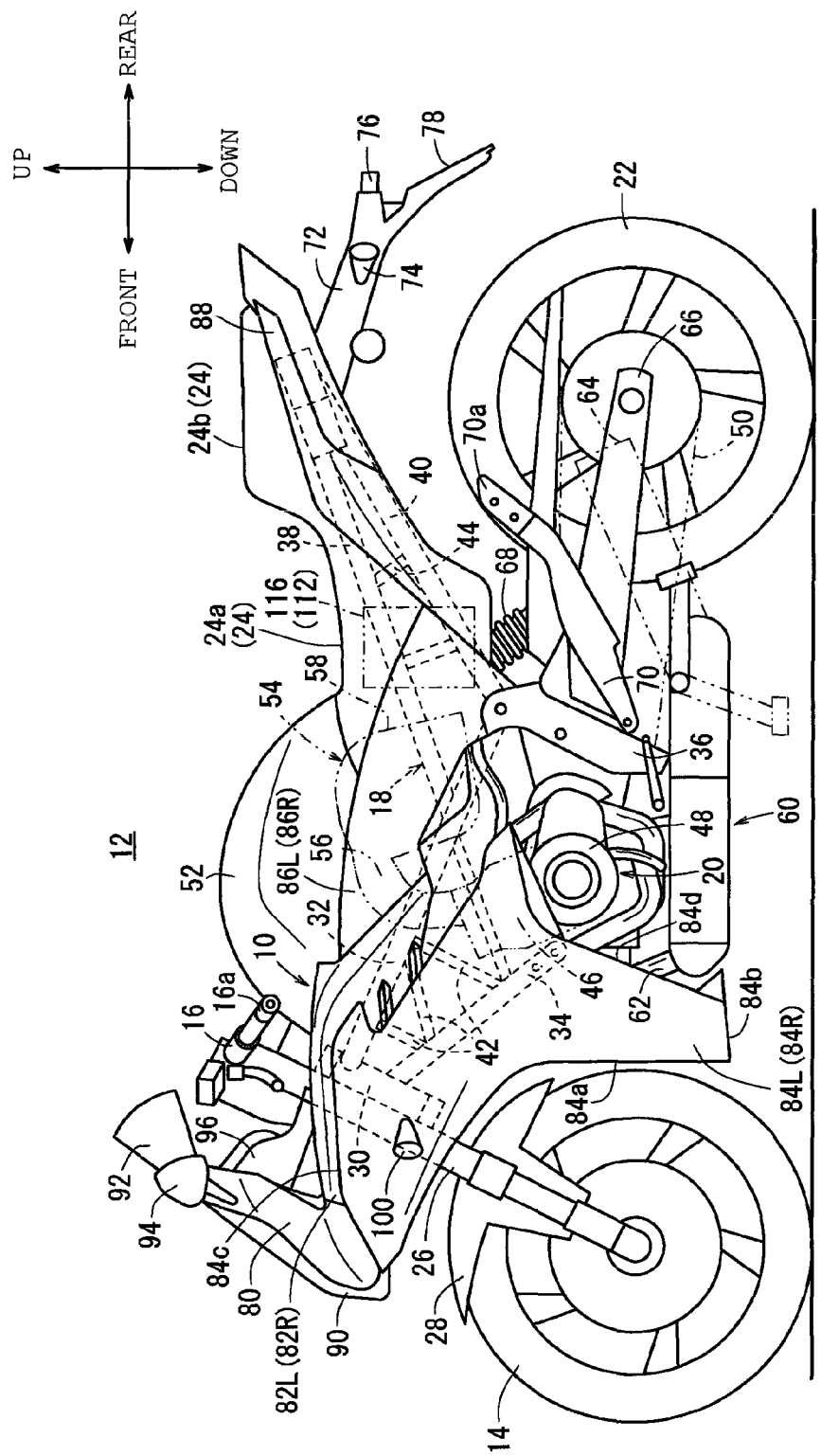
FIG. 1 is a schematic side view showing a saddle type motorcycle having a double-structured cowl.

FIG. 1 is a schematic side view showing a saddle type motorcycle (hereinafter referred also to simply as motorcycle) 12 having a double-structured cowl (body cover 10) according to an embodiment. In the following description, the present invention will be described in detail by showing this saddle type motorcycle as an example, but the invention is not to be restricted to this example and, naturally, is applicable to other types of motorcycles or motor bicycles, etc. Incidentally, of the mechanisms or components provided symmetrically in a left-right pair in a vehicle body of the motorcycle 12, those on the left side are denoted by reference symbols having "L" affixed to numeral, and those on the right side are denoted by reference symbols having "R" affixed to numeral. In addition, for easy understanding of the invention, the forward and rearward directions (FRONT, REAR) as well as the upper and lower directions (UP, DOWN) will be described with reference to the directions of the arrows in FIG. 1, and the leftward and rightward directions (LEFT, RIGHT) (see the directions of the arrows in FIG. 3) will be described with reference to the directions as viewed from the driver seated on the vehicle body, unless otherwise designated.

As shown in FIG. 1, the motorcycle 12 includes a front wheel 14 which is a steering wheel, a handlebar 16 for steering the front wheel 14, a body frame 18 constituting a vehicle body, an engine 20 which is a drive source, a rear wheel 22 which is a drive wheel, and a seat 24 on which to seat the riders.

The front wheel 14 is rotatably borne on the lower end side of a front fork 26 having a pair of members extending roughly vertically. A front fender 28 covering the upper side of the front wheel 14 is mounted to the front fork 26. In addition, the handlebar 16 is connected to the upper end side of the front fork 26, and the front fork 26 is turnably borne at a roughly middle portion thereof on a head pipe 30 belonging to the body frame 18.

The handlebar 16 extends in left-right symmetry along the vehicle width direction, with its joint to the front fork 26 as a center of symmetry. Grips 16a to be gripped by the driver are attached to both end portions of the handlebar 16.

The body frame 18 is composed, for example, of a tube frame of aluminum casting which is high in rigidity. The body frame 18 includes: a main frame 32 extending rearward from an upper portion of the head pipe 30 and being slowly inclined obliquely downward; a down frame 34 extending rearward from a lower portion of the head pipe 30 and being rapidly inclined obliquely downward; a pair of left and right pivot plates 36 connected to a rear end portion of the main frame 32 and extending downward from a roughly middle portion of the vehicle body; a seat frame 38 obliquely extending rearwardly upward from a roughly middle portion of the main frame 32; and a reinforcement frame 40 connected to the upper ends of the pivot plates 36 and extending obliquely upward toward a rear end portion of the seat frame 38. In addition, a plurality of front-side reinforcement stays 42 are connected between the main frame 32 and the down frame 34. Furthermore, a plurality of rear-side reinforcement stays 44 are connected between the seat frame 38 and the reinforcement frame 40.

The engine 20 includes a cylinder block 46 and a crankcase 48. The engine 20 may be, for example, of an in-line four-cylinder type. The engine 20 has a configuration in which a front end portion of the crankcase 48 is supported by the down frame 34, and a rear end portion of the crankcase 48 is supported by upper end portions of the pivot plates 36, whereby the engine 20 is fixed in such an attitude that the cylinder axis in the cylinder block 46 is inclined forwardly upward.

A spark plug(s) for combustion and a piston(s) for compression are contained in the cylinder block 46. On the other hand, inside the crankcase 48, a crankshaft connected to the piston(s) through a connecting rod(s) and an engine output shaft are rotatably supported, and a clutch mechanism and a transmission and the like constituting a power transmission mechanism are contained between the shafts. A rotational driving force of the engine 20 is transmitted from the engine output shaft in the crankcase 48 to an endless drive chain 50, and is transmitted through the drive chain 50 to the rear wheel 22.

In addition, a radiator (not shown) for radiating heat from the engine 20 is disposed forwardly of the cylinder block 46. Further, a fuel tank 52 and an intake system 54 are mounted on the upper side of the engine 20. The intake system 54 has an intake port 56 connected to an upper portion of the cylinder block 46, and an air cleaner 58 provided at an upstream end of the intake port 56. The air cleaner 58 is disposed so as to be covered with the fuel tank 52, and adsorbs dust and the like present in air taken in through the double-structured cowl which will be described later. On the other hand, an exhaust system 60 is connected to a front portion of the cylinder block 46. The exhaust system 60 includes a plurality of exhaust pipes 62 extending downward from the cylinder block 46 in individual correspondence with the cylinders, and an exhaust muffler 64 disposed on the right side of the rear wheel 22 so as to be continuous with each of the exhaust pipes 62.

Besides, on the pivot plates 36 of the body frame 18, a swing arm 66 is borne at its front end portion so that it can be swung upward and downward. Further, a suspension 68 for absorbing vibrations is attached to a front portion side of the swing arm 66, and the rear wheel 22 is rotatably supported on rear end portions of the swing arm 66. Furthermore, pillion steps 70 extending rearward are fixed to the pivot plates 36, and step holders 70a on which to put the driver's and passenger's feet are attached thereto.

On the other hand, the seat 24 on which the riders (the driver and the passenger) are to be seated is disposed on the seat frame 38. As the seat 24, there is adopted a so-called tandem type seat having a front seat 24a on which the driver is to be seated and a rear seat 24b on which the passenger is to be seated rearwardly of the front seat 24a.

A rear fender 72 roughly arcuate in shape in side view is mounted to a rear portion of the seat frame 38. Rear-side winker lamps 74 and a tail lamp 76 as lighting parts on the vehicle rear portion side are attached to the rear fender 72, and a license plate 78 is mounted under the tail lamp 76.

In addition, a body cover 10 constituting design surfaces (external appearance) of the vehicle body along the back-and-forth direction of the vehicle body is mounted on the motorcycle 12. The body cover 10 is formed, for example, from a polymer material such as acrylonitrile-butadiene-styrene (ABS), fiber-reinforced plastic (FRP) or polypropylene (PP).

The body cover 10 includes: a front cowl 80 constituting a design of a body front portion; a pair of left and right inner cowls 82L, 82R provided continuously with and on the rear side of both side surfaces of the front cowl 80 and extending rearward from both lateral sides; a pair of left and right outer cowls 84L, 84R partly covering the inner cowls 82L, 82R on the outer sides of the inner cowls 82L, 82R; a pair of left and right middle cowls 86L, 86R provided continuously with and on the rear side of the inner cowls 82L, 82R and extending to the lower side of the front seat 24a; and a rear cowl 88 provided continuously with and on the rear side of the middle cowls 86L, 86R and extending rearward along the seat frame 38.

Figure 2:
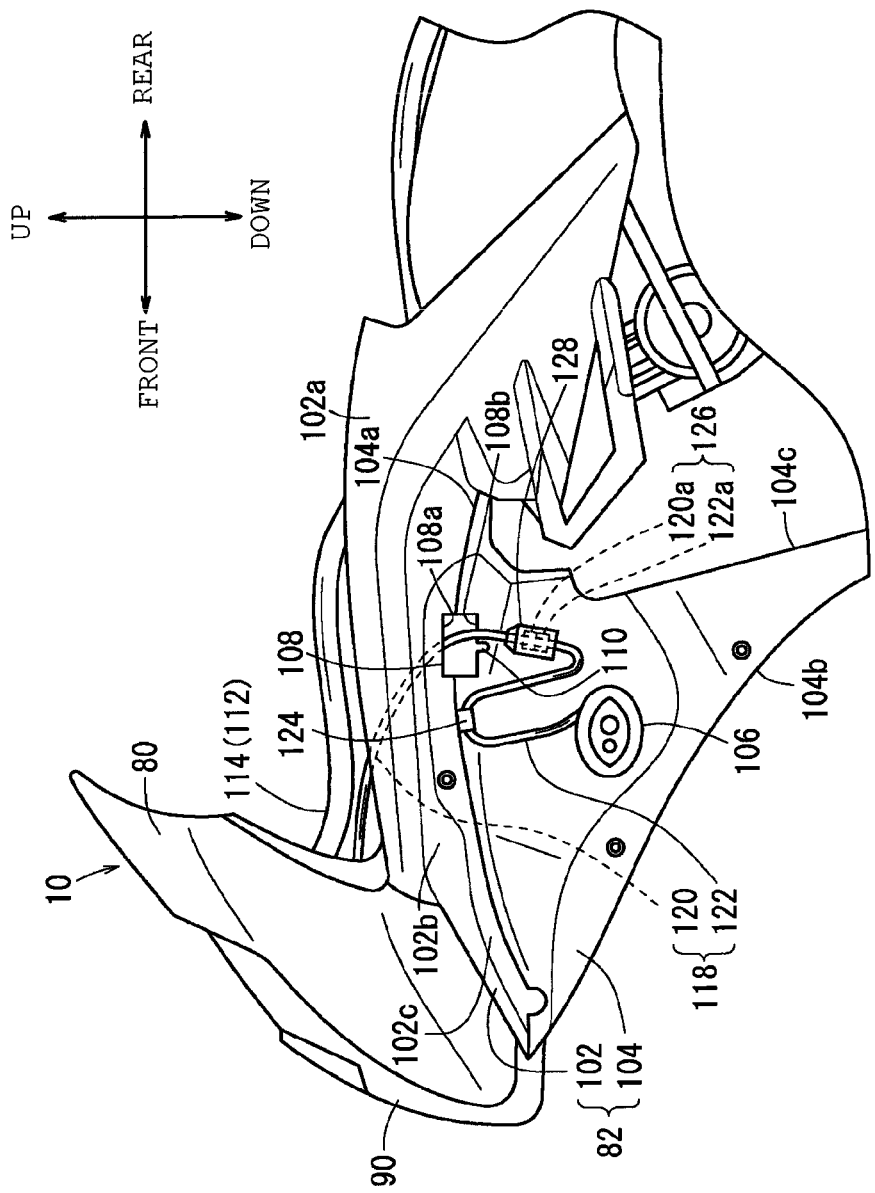
FIG. 2 is a partial enlarged side view showing a front upper portion of a vehicle body of the motorcycle of FIG. 1, with an outer cowl removed.
Figure 3:
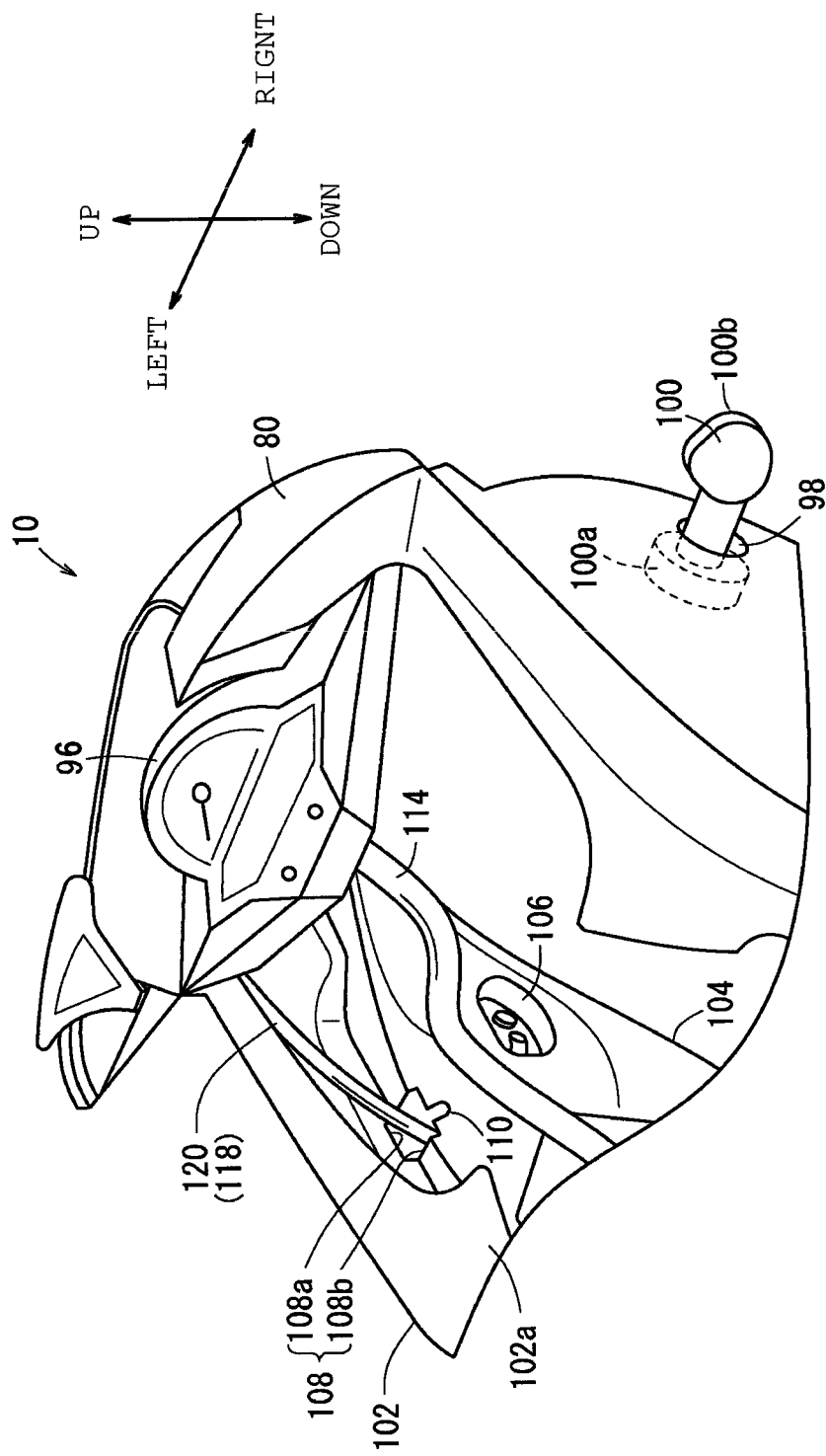
FIG. 3 is a partial perspective view showing schematically the motorcycle of FIG. 1, as viewed from an oblique rear side.

Now, the body cover 10 at a front portion of the motorcycle 12 according to the present embodiment and the configuration relating to the body cover 10 will be described below referring to FIGS. 1 to 3. FIG. 2 is a partial enlarged side view showing a front upper portion of the vehicle body of the motorcycle 12 of FIG. 1, with the outer cowl 84 removed. FIG. 3 is a partial perspective view showing schematically the motorcycle 12 of FIG. 1, as viewed from an oblique rear side. Incidentally, in FIGS. 2 and 3, irrelevant configurations are omitted. In the following description, the inner cowl 82L and the outer cowl 84L on the left side as viewed from the driver will be described in detail, whereas descriptions of the inner cowl 82R and the outer cowl 84R on the right side which can be configured in symmetry with the left-side ones will be omitted (in the following description, letter L affixed to the numeral denoting a component to indicate that the component is on the left side will be omitted).

The front cowl 80 is formed in such a shape as to cover a roughly middle portion of the front fork 26 and the head pipe 30 on the front side of them. At the front surface of the front cowl 80 a headlight 90 is disposed which illuminates the front side of the vehicle during traveling. The headlight 90 according to the present embodiment has a lens formed to be continuous with a design surface of the front cowl 80. Specifically, the headlight 90 and the front cowl 80 are formed in a streamline shape which is slowly inclined in the vehicle width direction and upward as one goes rearward from a central portion of the tip (front end) thereof.

In addition, the front cowl 80 has an arcuate cutout in a central upper end portion thereof (see FIG. 3), and a front screen 92 formed in such a shape as to relieve resistance of an airflow induced by traveling of the vehicle is attached to the cutout section (see FIG. 1). On both sides in the vehicle width direction of the front screen 92, a pair of left and right rear-view mirrors 94 are mounted. On the rear side of the front cowl 80, a meter unit 96 is disposed in which meters such as a speedometer and a tachometer are contained. In addition to the meters, the meter unit 96 also contains switches with which the driver performs operations (controls) of various electric systems.

As shown in FIG. 1, the outer cowls 84 extend from the rear side of both side portions of the front cowl 80 to roughly middle portions of the vehicle body, and constitute the designs of both side surfaces of the vehicle body. Of the outer cowl 84, a front end edge portion 84a is curved so that the front wheel 14 is exposed, a lower end edge portion 84b is formed roughly horizontal at the same position as the exhaust system 60, an upper end edge portion 84c extends rearward from the front end edge portion 84a along the shape of the inner cowl 82 on the inside and extends obliquely downward at the roughly middle portion, and a rear end edge portion 84d is curved so that the crankcase 48 is partly exposed. The outer cowl 84 is provided with a passing hole 98 (see FIG. 3) in its side surface at a position rather on the front side. A front-side winker lamp (hereinafter referred to simply as a winker lamp) 100 extending in the vehicle width direction from the inner cowl 82 is passed through the passing hole 98.

As shown in FIG. 2, the inner cowls 82 extend from the rear side of both side portions of the front cowl 80 to roughly middle portions of the vehicle body. The inner cowl 82 includes an upper-side inner cowl 102 connected to a rear portion of the front cowl 80 and extending roughly horizontally toward the rear side, and a lower-side inner cowl 104 connected to a lower end portion of the upper-side inner cowl 102.

The upper-side inner cowl 102 projects in the vehicle width direction at a vertically central portion thereof, and the projecting portion extends in an edge line shape from the front side toward the rear side. An upper portion 102a of the upper-side inner cowl 102 extends from the edge line part toward the inside of the vehicle body, and covers the upper surface of a side portion of the inside structure (see FIG. 3). On the other hand, a lower portion 102b of the upper-side inner cowl 102 extends in a tapered shape from the edge line part toward the inside of the vehicle body, and a mounting section 102c extending roughly downward is formed at the lower-side edge part of the lower portion 102b. To the mounting section 102c, the lower-side inner cowl 104 is mounted.

The lower-side inner cowl 104 is formed in a roughly triangular shape, and its upper end edge portion 104a is formed in a shape for engagement with the mounting section 102c of the upper-side inner cowl 102. Of the lower-side inner cowl 104, a front end edge portion 104b is curved so that the front wheel 14 is exposed, like the front end edge portion 84a of the outer cowl 84, whereas a rear end edge portion 104c extends roughly vertically. The lower-side inner cowl 104, with the outer cowl 84 mounted on the outside thereof, is covered by the outer cowl 84 so as to be invisible from the lateral side.

The lower-side inner cowl 104 is provided at its flat surface portion with a mounting section 106 to which a base portion 100a of the winker lamp 100 is to be mounted. The mounting section 106 is formed at such a position as to coincide roughly with the passing hole 98 in the outer cowl 84 in the condition where the outer cowl 84 is mounted on the outside.

Here, the inner cowl 82 according to the present embodiment is provided with a through-hole 108 through which a cable 118 of an electric system (described later) is to be passed. The through-hole 108 is formed at a boundary part between the upper-side inner cowl 102 and the lower-side inner cowl 104. Specifically, the through-hole 108 is formed by engagement between a first cutout section 108a formed in the mounting section 102c of the upper-side inner cowl 102 and a second cutout section 108b formed in the upper end edge portion 104a of the lower-side inner cowl 104. Since the first and second cutout sections 108a, 108b are thus formed in the boundary part between the upper-side inner cowl 102 and the lower-side inner cowl 104, it is unnecessary to provide a step of boring the through-hole 108 at the time of forming (molding) the inner cowl 82, so that efficiency of the forming (molding) process can be enhanced.

Further, the second cutout section 108b of the lower-side inner cowl 104 has a recess (locking section) 110 cut out along a flat surface shape of the lower-side inner cowl 104. The recess 110 is formed in such depth and width that the first and second cables 120, 122 (described later) can be retained thereby. In the condition where the first and second cutout sections 108a, 108b are engaged with each other to form the through-hole 108, the recess 110 is located at a predetermined position of a side peripheral edge surrounding the through-hole 108.

As above-described, the body cover 10 in the present embodiment has the double-structured cowl having the inner cowl 82 and the outer cowl 84 laid over each other, and constitutes the designs on both side surfaces at the front of the motorcycle 12. On the inside surface of the inner cowl 82, parts of a control system for controlling the electric system 112 of the motorcycle 12 are mounted. Here, the electric system 112 includes lighting parts such as the headlight 90, the tail lamp 76, front-side and rear-side winker lamps 74, 100, etc., an ECU (Engine Control Unit) for controlling the driving of the engine 20, and electrical equipments (not shown) such as an ignition coil(s), a spark plug(s), a regulator, an ACG (AC generator), sensors (e.g., TH sensor, intake temperature sensor), etc.

In addition, the electric system 112 includes a main harness 114 extending in the back-and-forth direction of the vehicle body. The main harness 114 is connected to a battery 116 (FIG. 1) disposed at a roughly central part of the vehicle body. Besides, the main harness 114 is connected to the electrical equipment (a drive system for the engine 20) disposed inside the inner cowl 82, and is connected to the meter unit 96 on the rear side of the front cowl 80. The electric system 112 has a configuration in which a plurality of cables 118 branched from the main harness 114 and the meter unit 96 are connected to the lighting parts and other electric equipment. By this, electric power (or electrical signals) according to the driver's operations and the drive system, etc. are sent through the cables 118 to the lighting parts and other electrical equipments.

Now, the winker lamp (front-side winker lamp 100) as one of the lighting parts will be described specifically below. As shown in FIG. 3, the winker lamp 100 includes the base portion 100a mounted to the mounting section 106, and a lighting portion 100b extending in the vehicle width direction from the base portion 100a and capable of lighting as a winker (incidentally, in FIG. 3, the winker lamp 100 on the right side of the vehicle body is shown, for convenience).

The base portion 100a is provided with a connection terminal (not shown) electrically connected upon mounting to the mounting section 106, and electric power is supplied through the connection terminal to a bulb (not shown) disposed inside the lighting portion 100b. The winker lamp 100 is so mounted that the lighting portion 100b is passed through the passing hole 98 in the outer cowl 84, to project toward the vehicle-width-directionally outer side. The winker lamp 100 is mounted by a method in which after the mounting of the body cover 10 (the inner cowl 82 and the outer cowl 84) is finished, the base portion 100a of the winker lamp 100 is inserted via the passing hole 98 in the outer cowl 84, and the base portion 100a is mounted (locked) to the mounting section 106.

The winker lamp 100 is connected to the meter unit 96 through the cables 118 (the first cable 120, the second cable 122). Specifically, the winker lamp 100 is connected to a winker switch (not shown) in the meter unit 96, and lighting of the lighting portion 100b is performed based on a winker turning-on operation by the driver.

In this case, the first cable 120 through which electric power can be supplied to the winker lamp 100 is disposed at the meter unit 96, whereas the second cable 122 to be connected to the first cable 120 is disposed at the mounting section 106 of the inner cowl 82. As the first and second cables 120, 122, cables with such length as to reach the through-hole 108 are used, whereby sufficiently short cables can be applied as compared with the case where, for example, the first cable 120 and the second cable 122 are connected while passing around the inner cowl 82. In addition, the second cable 122 is locked at a predetermined part thereof by a hook 124 on the inner cowl 82 (see FIG. 2) so that the second cable 122 would not droop down from the mounting section 106 to touch the ground surface, in the condition where the inner cowl 82 is mounted.

As shown in FIG. 2, the first cable 120 and the second cable 122 are interconnected through couplers provided at their connecting end portions. Specifically, the first cable 120 is provided with a male-type coupler 120a at the connecting end portion thereof, while the second cable 122 is provided with a female-type coupler 122a at the connecting end portion thereof. With the male-type coupler 120a inserted into the female-type coupler 122a, they are locked to each other, whereby the first cable 120 and the second cable 122 are connected to each other. Incidentally, the connection structure between the first cable 120 and the second cable 122 is not restricted to the interconnection of the male-type coupler 120a and the female-type coupler 122a; naturally, a variety of configurations can be adopted.

In addition, as shown in FIG. 2, to the joint part between the male-type coupler 120a and the female-type coupler 122a (hereinafter referred also to simply as joint part 126), a cover member 128 is mounted which covers the male-type coupler 120a and the female-type coupler 122a from above. The cover member 128 has the function of preventing dust in air or water conducted along the cables 118 from entering into the cables 118 via the joint part 126.

The motorcycle 12 having the double-structured cowl (body cover 10) according to the present embodiment is basically configured as above. Now, operation and effect of the through-hole 108 and the recess 110 which are possessed by the body cover 10 will be described below.

The through-hole 108 and the recess 110 possessed by the inner cowl 82 exhibit conspicuous operation and effect mainly in assemblage of the motorcycle 12. In assemblage of the motorcycle 12, normally, the front cowl 80 and the upper-side inner cowl 102 are mounted to the vehicle body provided with an inside structure. In this case, the front cowl 80 is put, from the front side, on the meter unit 96 previously mounted to the body frame 18, and is fixed on the rear portion side thereof to the head pipe 30. On the other hand, the upper-side inner cowl 102 is extended roughly horizontally on the rear side of both side portions of the front cowl 80. As a result, the vehicle body is formed to be a design surface wherein the front cowl 80 and the upper-side inner cowl 102 are integrally continuous with each other.

Thereafter, the lower-side inner cowl 104 is mounted to the mounting section 102c extending from the lower portion side of the upper-side inner cowl 102. In this instance, the second cable 122 is disposed at the mounting section 106 of the lower-side inner cowl 104. Of the second cable 122, a predetermined part near the mounting section 106 is locked by the hook 124, and a predetermined part near the female-type coupler 122a is preliminarily caught in the recess 110 of the second cutout section 108b. Specifically, the second cable 122 is in the state in which its tip side (female-type coupler 122a) is led out to an upper portion of the lower-side inner cowl 104.

Figure 4:
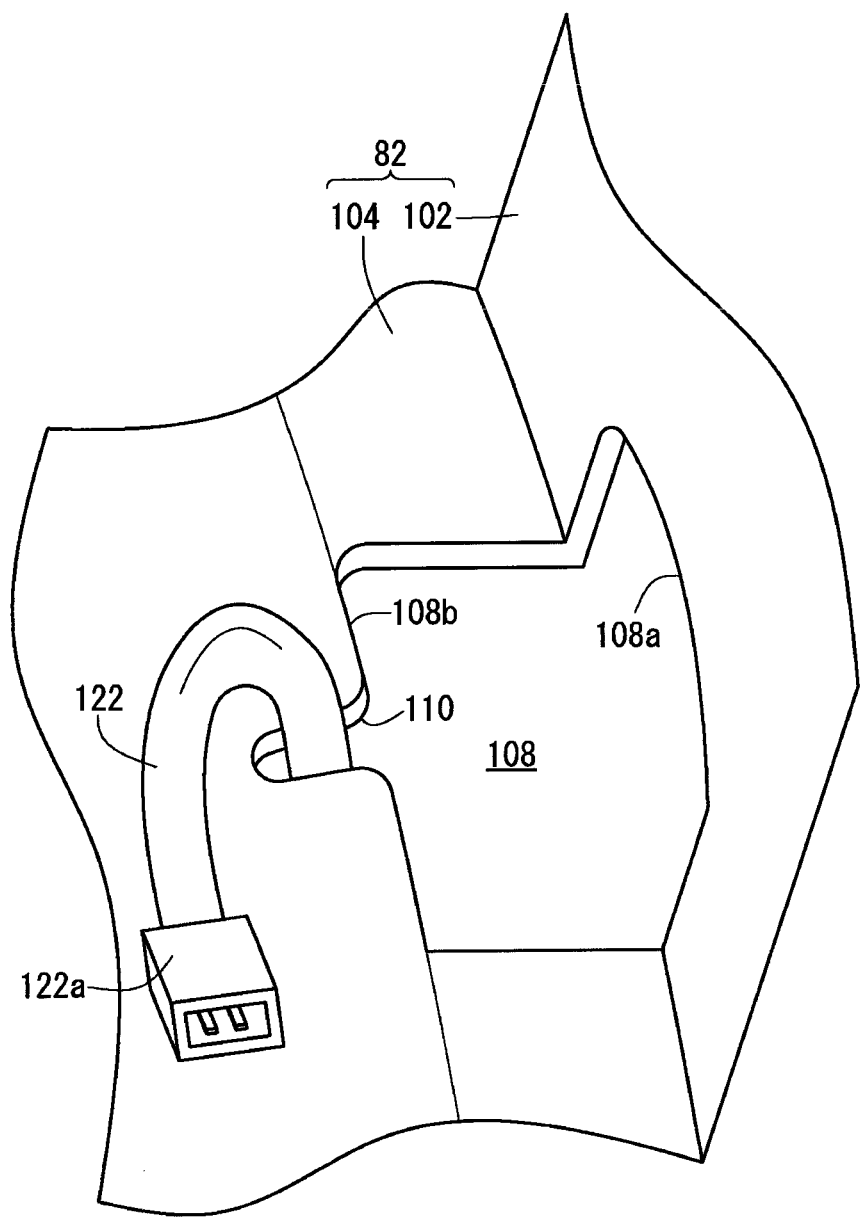
FIG. 4 is an illustration of a state in which a second cable is exposed at an upper portion of an inner cowl, in the motorcycle of FIG. 1.
Figure 5:
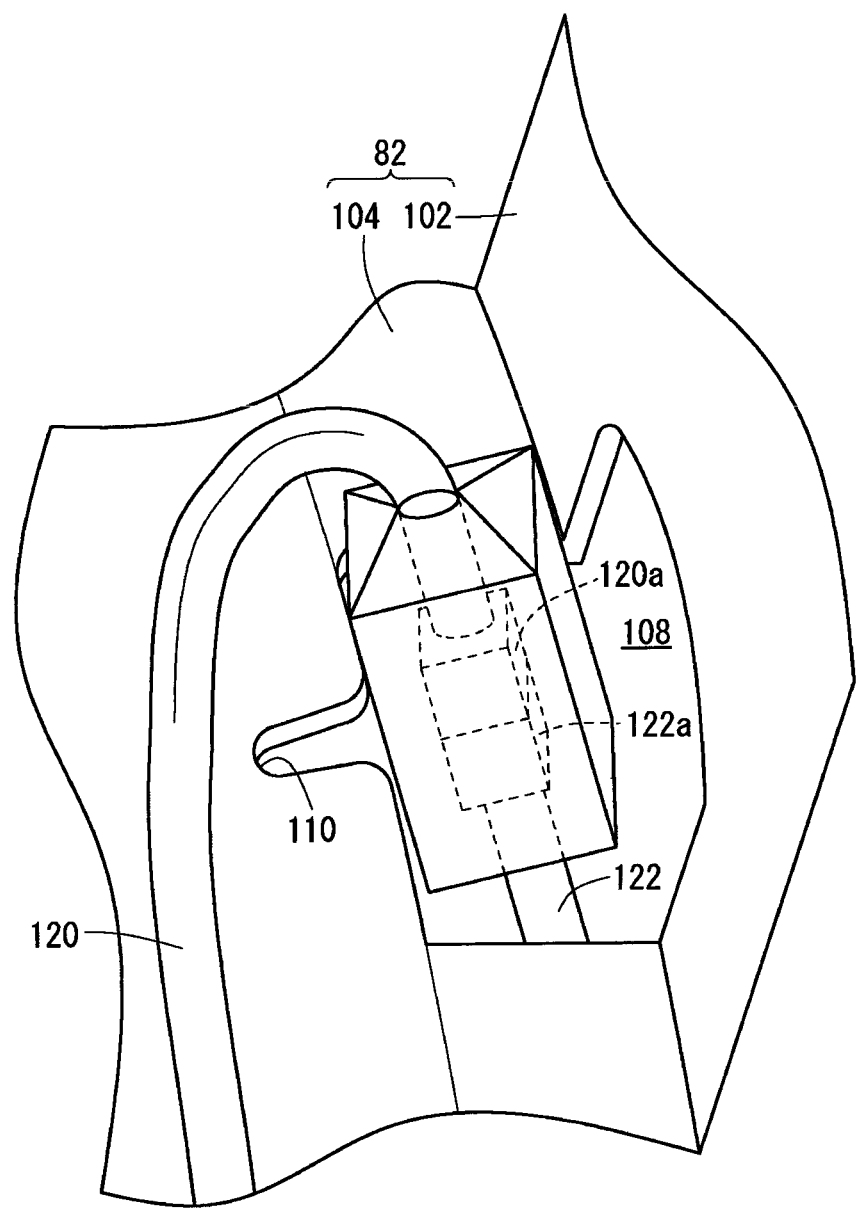
FIG. 5 is an illustration of a joint part between a first cable and the second cable and a mounted state of a cover member, in the motorcycle of FIG. 1.
Figure 6:
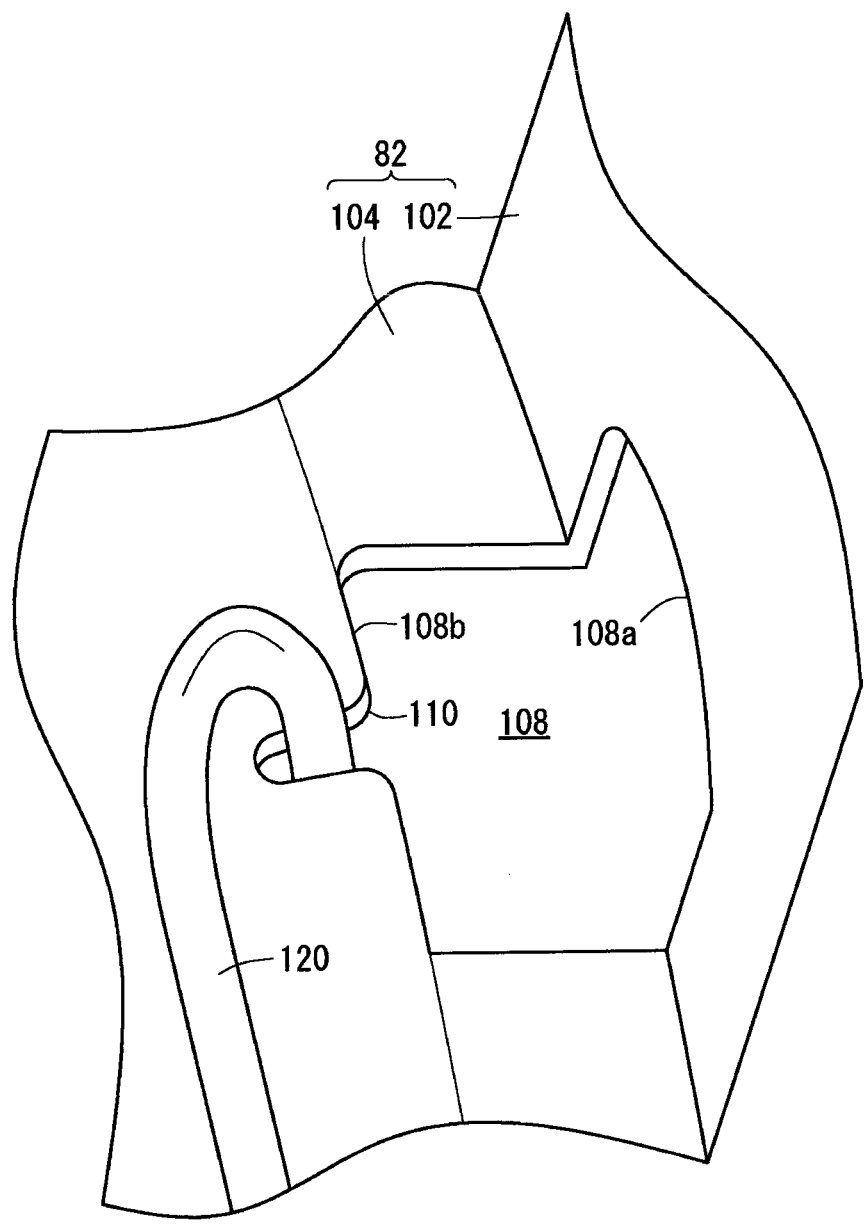
FIG. 6 is an illustration of a state in which the first cable is locked in a recess, in the motorcycle of FIG. 1.

FIGS. 4 to 6 are illustrations of the procedure of connection between the first cable 120 and the second cable 122. When the lower-side inner cowl 104 is mounted to the upper-side inner cowl 102 in the condition where the second cable 122 is locked in the recess 110, the through-hole 108 is formed and, as shown in FIG. 4, the tip side of the second cable 122 is exposed from the lower side of the through-hole 108 (from the lower portion 102b of the upper-side inner cowl 102) to the upper side of the through-hole 108 (to the upper portion of the lower-side inner cowl 104). In this instance, a predetermined part of the second cable 122 is caught in the recess 110, so that the second cable 122 is prevented from slipping off the recess 110. This ensures that when, for example, an external force such as vibration is exerted at the time of mounting the inner cowl 82 and the outer cowl 84, the second cable 122 is prevented from slipping out of the recess 110, and the state in which the female-type coupler 122a is exposed at an upper portion of the inner cowl 82 is maintained.

After the inner cowl 82 is mounted to the vehicle body, the outer cowl 84 is mounted to the outside of the inner cowl 82. At the time of mounting the outer cowl 84, the tip side of the second cable 122 disposed on the inner cowl 82 has been led out to the upper side of the through-hole 108 as above-mentioned, so that the second cable 122 is prevented from becoming bulky on a side surface of the inner cowl 82 to serve as an obstacle. Therefore, the outer cowl 84 can be easily mounted to the inner cowl 82.

Besides, in the motorcycle 12, the winker lamp 100 is mounted to the inner cowl 82, as above-mentioned. In this case, the base portion 100a of the winker lamp 100 is inserted through the passing hole 98 in the outer cowl 84, and is mounted to the mounting section 106 of the inner cowl 82. Attendant on this mounting, electrical continuity between the connection terminal at the base portion 100a of the winker lamp 100 and the second cable 122 is attained.

Furthermore, in the wiring of the electric system 112 after the mounting of the cover member 128, connection between the first cable 120 extending from the meter unit 96 and the second cable 122 extending from the mounting section 106 is carried out. As a result, the winker lamp 100 is connected through the first and second cables 120, 122 to the meter unit 96 and, further, connected through the main harness 114 to the battery 116. The connection of the first cable 120 and the second cable 122 to each other is accomplished by insertion of the male-type coupler 120a into the female-type coupler 122a.

Here, of the second cable 122, a predetermined part near the female-type coupler 122a is locked by the recess 110, and the female-type coupler 122a is exposed at the upper surface of the inner cowl 82 (see FIG. 4), as above-mentioned. In connecting the first cable 120 and the second cable 122 to each other, the second cable 122 is moved in the opening direction of the recess 110 (in the direction of the through-hole 108) so as to release the locking thereof in the recess 110. Then, the first and second cables 120, 122 are led out together, and coupling between the male-type coupler 120a and the female-type coupler 122a is conducted on the upper surface of the inner cowl 82. Accordingly, the first cable 120 and the second cable 122 can be easily connected to each other.

In addition, in connecting the first cable 120 and the second cable 122 to each other, the cover member 128 is so mounted as to cover the male-type coupler 120a and the female-type coupler 122a. The mounting of the cover member 128 can also be easily conducted on the upper surface of the inner cowl 82. Specifically, by using the through-hole 108 and the recess 110 according to the present embodiment, the process of connecting the first cable 120 and the second cable 122 can be made efficient as a whole. After the connection between the first cable 120 and the second cable 122 is finished, the joint part 126 is disposed in a gap formed between the inner cowl 82 and the outer cowl 84. In this case, as shown in FIG. 5, the cover member 128 is passed through the through-hole 108 together with the joint part 126. The through-hole 108 is formed in such a size that the flat surface area of the cover member 128 can be passed therethrough, and even the cover member 128 with such a comparatively large size as to cover the joint part 126 can be passed through the through-hole 108. Therefore, the joint part 126 and the cover member 128 can be easily disposed in the gap between the inner cowl 82 and the outer cowl 84.

After the joint part 126 and the cover member 128 are passed through the through-hole 108, the first cable 120 is locked by hooking the first cable 120 in the recess 110, as shown in FIG. 6. As a result, wiring of the winker lamp 100 is finished. After the wiring is finished, the first cable 120 is locked in the recess 110, whereby the cable 118 can be prevented from moving. For instance, even during traveling of the motorcycle 12, the first cable 120 and the second cable 122 can be kept in a favorably connected state.

Besides, with the joint part 126 disposed in the gap between the inner cowl 82 and the outer cowl 84, the joint part 126 can be prevented by the outer cowl 84 from being seen from the outside, whereby external appearance of the vehicle body can be enhanced. Further, when the joint part 126 is disposed outside the inner cowl 82, the space for containing the electric system 112 is increased and the degree of freedom in wiring can be enhanced, as compared with a configuration in which the joint part 126 is disposed inside the inner cowl 82.

Incidentally, a configuration may be adopted in which the through-hole 108 is covered with a cover (not shown) and only the recess 110 where the first cable 120 is passed and locked is opened. With the through-hole 108 thus covered with a cover, the possibility of dust or water moving toward the joint part 126 can be reduced.

In addition, at the opening section of the recess 110 (at the boundary part between the recess 110 and the through-hole 108), a stopper (not shown) for bridging the opening section may be mounted. By such a stopper, the first cable 120 (or the second cable 122) can be more securely prevented from slipping out of the opening section of the recess 110.

Further, the through-hole 108 is not restricted to the one formed in the inner cowl 82; for example, it may be formed in the outer cowl 84.

As above-mentioned, the motorcycle 12 according to the present embodiment has the through-hole 108 formed in the inner cowl 82, whereby the first cable 120 and the second cable 122 can be connected to each other through the through-hole 108, so that a shorter cable 118 can be applied as compared, for example, with the case where the first cable 120 and the second cable 122 are connected to each other while passing around the inner cowl 82. Consequently, a reduction in the manufacturing cost of the vehicle body can be achieved.

Furthermore, with the recess 110 formed at a peripheral edge portion of the through-hole 108, the cable 118 can be easily locked by the recess 110. Specifically, the second cable 122 in the state of being exposed from the gap between the inner cowl 82 and the outer cowl 84 is locked in the recess 110 and then the first cable 120 and the second cable 122 are connected to each other, whereby the time taken to interconnect the first and second cables 120, 122 can be shortened, and the efficiency of the vehicle body manufacturing process can be enhanced.

Incidentally, the present invention is not restricted to the above-described embodiment, and, naturally, a variety of configurations can be adopted without departure from the gist of the invention.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A cowled vehicle, comprising:
an inner cowl covering an inside structure of a vehicle body;
an outer cowl covering at least a part of said inner cowl, outside of said inner cowl,
a first cable disposed inside said inner cowl; and
a second cable disposed between said inner cowl and said outer cowl and connected to said first cable,
wherein either one of said inner cowl and said outer cowl includes a through-hole through which said first cable or said second cable are passable; and
wherein said through-hole includes a locking section which can retain a part of said first cable or said second cable.

2. The cowled vehicle according to claim 1,
wherein said locking section is a recess formed by partly cutting out a side peripheral edge of said through-hole.

3. The cowled vehicle according to claim 1,
wherein said first cable and said second cable are electrically connected to each other through connection couplers, and
wherein said through-hole is sized that said couplers can be passed therethrough.

4. The cowled vehicle according to claim 2,
wherein said first cable and said second cable are electrically connected to each other through connection couplers, and
wherein said through-hole is sized that said couplers can be passed therethrough.

5. The cowled vehicle according to claim 1,
wherein said first cable is connected to a battery at an end portion thereof opposite to an end portion thereof for connection with said second cable, and
wherein said second cable is connected to a winker lamp at an end portion thereof opposite to an end portion thereof for connection with said first cable.

6. The cowled vehicle according to claim 1,
wherein said first cable is connected to a battery at an end portion thereof opposite to an end portion thereof for connection with said second cable, and
wherein said second cable is connected to a winker lamp at an end portion thereof opposite to an end portion thereof for connection with said first cable.

7. The cowled vehicle according to claim 2,
wherein said first cable is connected to a battery at an end portion thereof opposite to an end portion thereof for connection with said second cable, and
wherein said second cable is connected to a winker lamp at an end portion thereof opposite to an end portion thereof for connection with said first cable.

8. The cowled vehicle according to claim 3,
wherein said first cable is connected to a battery at an end portion thereof opposite to an end portion thereof for connection with said second cable, and
wherein said second cable is connected to a winker lamp at an end portion thereof opposite to an end portion thereof for connection with said first cable.

9. The cowled vehicle according to claim 4,
wherein said first cable is connected to a battery at an end portion thereof opposite to an end portion thereof for connection with said second cable, and
wherein said second cable is connected to a winker lamp at an end portion thereof opposite to an end portion thereof for connection with said first cable.

10. The cowled vehicle according to claim 5,
wherein said inner cowl includes a mounting section, said second cable being connected to said mounting section,
wherein said winker lamp includes a base portion attached to said mounting section and a lighting portion which projects in a vehicle width direction from said base portion while penetrating said outer cowl and is supplied with electric power to perform lighting, and
wherein electrical continuity is present between said second cable and said lighting portion.

11. The cowled vehicle according to claim 6,
wherein said inner cowl includes a mounting section, said second cable being connected to said mounting section,
wherein said winker lamp includes a base portion attached to said mounting section and a lighting portion which projects in a vehicle width direction from said base portion while penetrating said outer cowl and is supplied with electric power to perform lighting, and
wherein electrical continuity is present between said second cable and said lighting portion.

12. The cowled vehicle according to claim 7,
wherein said inner cowl includes a mounting section, said second cable being connected to said mounting section,
wherein said winker lamp includes a base portion attached to said mounting section and a lighting portion which projects in a vehicle width direction from said base portion while penetrating said outer cowl and is supplied with electric power to perform lighting, and
wherein electrical continuity is present between said second cable and said lighting portion.

13. The cowled vehicle according to claim 8,
wherein said inner cowl includes a mounting section, said second cable being connected to said mounting section,
wherein said winker lamp includes a base portion attached to said mounting section and a lighting portion which projects in a vehicle width direction from said base portion while penetrating said outer cowl and is supplied with electric power to perform lighting, and wherein electrical continuity is present between said second cable and said lighting portion.

14. The cowled vehicle according to claim 9, wherein said inner cowl includes a mounting section, said second cable being connected to said mounting section, wherein said winker lamp includes a base portion attached to said mounting section and a lighting portion which projects in a vehicle width direction from said base portion while penetrating said outer cowl and is supplied with electric power to perform lighting, and wherein electrical continuity is present between said second cable and said lighting portion.

* * * * *